United States Patent
Cronstedt

[11] 3,814,549
[45] June 4, 1974

[54] GAS TURBINE ENGINE WITH POWER SHAFT DAMPER

[75] Inventor: Val Cronstedt, Williamsport, Pa.

[73] Assignee: Avco Corporation, Williamsport, Pa.

[22] Filed: Nov. 14, 1972

[21] Appl. No.: 306,443

[52] U.S. Cl................ 417/406, 415/119, 64/1 R, 60/39.28
[51] Int. Cl................................ F04b 17/00
[58] Field of Search............ 415/119; 64/1 R, 2 R; 74/574; 60/39.28; 417/407, 406

[56] References Cited
UNITED STATES PATENTS

| | | | |
|---|---|---|---|
| 1,935,683 | 11/1933 | Wemp | 74/574 |
| 2,850,876 | 9/1958 | Wood | 64/1 R |
| 3,000,197 | 9/1961 | Ruegg et al. | 64/2 R |
| 3,301,009 | 1/1967 | Coulter, Jr. | 74/574 |
| 3,632,222 | 1/1972 | Cronstedt | 415/119 |

Primary Examiner—C. J. Husar
Attorney, Agent, or Firm—Charles M. Hogan; Garry M. Gron

[57] ABSTRACT

A gas turbine engine has an elongated thin wall, annular shaft extending from a rotor, including a turbine wheel to a reduction gear assembly for a variable pitch fan. A cylindrical metallic spring is placed in the interior of the shaft and is forced against its inner wall by centrifugal force to dampen vibrations.

6 Claims, 1 Drawing Figure

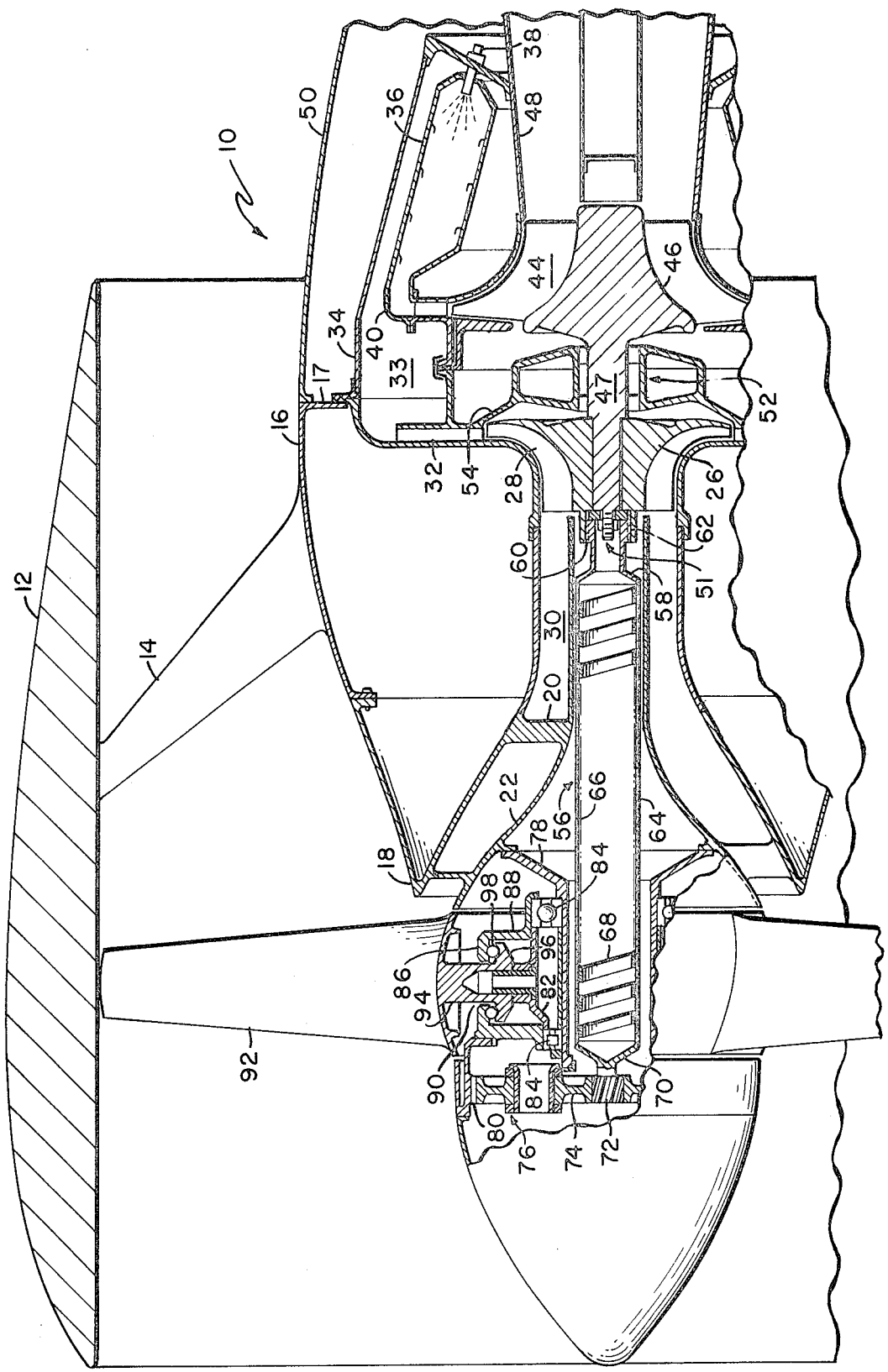

GAS TURBINE ENGINE WITH POWER SHAFT DAMPER

BACKGROUND OF THE INVENTION

Damping arrangements for shafts used in rotating machinery have been extensively developed over the years. The reason for this is that machinery that rotates frequently encounters a condition where the shaft passes through a speed which matches its own natural bending or torsional frequency. At this speed the shaft experiences a violent vibration that if left undamped can cause the shaft to self-destruct. Among the approaches to introduce damping is the one illustrated by D. R. Roland et al., U.S. Pat. No. 2,751,765, which shows a corrugated insert positioned over an inner core within the propeller shaft of a motor vehicle. The liner and the core are made of cardboard press fitted into the shaft. While this approach may be effective to dampen resonant vibrations that occur in a vehicle propeller shaft rotating at a relatively low rate, it is incapable of functioning in a gas turbine engine environment. Gas turbine engines may require a long, slender shaft rotating at a high rate, which makes the use of a light material, such as cardboard, impractical and ineffective in this type of application.

SUMMARY OF THE INVENTION

A gas turbine engine has a relatively thin wall, elongated annular shaft connecting a rotor with a power output element. A cylindrical spring of metallic material is positioned inside the shaft and has a sufficient density so that centrifugal force urges it outward into engagement with the interior wall of the shaft causing friction with the wall to dampen vibrations. Centrifugal force of a high order acting on the heavy metallic spring material creates the friction needed for effective vibration damping.

The above and other related features of the present invention will be apparent from a reading of the description of the following disclosure and as shown in the accompanying drawing. The novelty thereof is pointed out in the appended claims.

The single FIGURE illustrates a gas turbine engine having an elongated power shaft incorporating a damping device embodying the present invention.

Referring to the drawing, there is shown a gas turbine engine 10 of a turbofan type. It should be apparent, however, as the discussion proceeds that the invention would be applicable to other types of gas turbine engines, for example, a turboshaft engine. The engine comprises an outer annular fan shroud 12 supported by a series of combination fan stator vanes and struts 14 extending inward to an annular outer engine housing 16. Housing 16 has a forward diverging nose section 18 secured to it which has integral struts 20 extending to an inner housing 22. These struts transmit the torque resulting from the output power. A rotatable centrifugal compressor hub 26 has blades 28 which act on air passing through an inlet 30 formed between housings 18 and 22. The compressor, driven by a turbine, spins at a high rate of speed and pressurizes air for delivery through a diffuser 32 which is secured to housing 16 at a flange 17. The air passes into a chamber 33 defined by a housing 34 in which a perforated combustor 36 of the annular type is positioned. The pressurized air passes inward through perforations in combustor 36 and a series of fuel nozzles 38 (only one of which is shown) inject fuel which is mixed with the air and ignited to provide a hot gas stream which passes through a discharge duct 40 to a radial turbine inlet nozzle 42. From there the gas stream passes across the blades 44 of a centripetal turbine hub 46 having an integral shaft 47. The compressor hub 26 is telescoped over shaft 47 and held on it by retainer 51. The exhaust gas stream from the turbine passes out a duct 48 which connects with an outer housing 50 surrounding the aft position of the engine. Shaft 47 is journaled by means of bearing assemblies 52 supported by a conical frame element 54 structurally connected to the compressor diffuser 32.

The rotatable output of the compressor and turbine hubs 26 and 46 is fed to a power output shaft assembly 56 which comprises an aft end cap 58 connected to compressor hub 26 by external splines 60 engaging internal splines 62 in the forward face of compressor hub 26. An elongated thin wall, tubular central shaft portion 64 is suitably secured to the end cap 58 by brazing or welding. Contained within the interior walls 66 of the tube 64 is a cylindrical spring 68 made of a resilient metal, such as bronze or steel. The spring 68 extends over substantially the entire length of the tube 64. Preferably, the outside diameter of the spring 68 in its relaxed state is greater than the diameter of the interior walls 66 of shaft 64 to insure that the spring 68 is in positive contact with walls 66 of the tube 64 at all times. A forward end cap 70 is secured to the opposite end of tube 64 by brazing or welding. It should be pointed out that the spring would be inserted in the tube 64 before both caps are secured. The end cap 70 has an integral helix sun gear 72 which engages a series of fixed helix planet gears 74 journaled in a frame 76 secured to the forward end of a tubular support frame 78 secured to housing 22. A ring gear 80 is secured to an annular fan support shaft 82 journaled over support 78 by bearings 84. An annular hub element 86 is secured to ring gear 80 and has an aft flange 88 secured to fan support shaft 82. A series of blades 92 have integral bases 94 extending through holes 90 in hub 86. Bases 94 have integral flanges 96 journaled relative to hub 86 by ball elements 98. A suitable means (not shown) is provided for rotating the blades to vary their pitch angle.

In operation, the combined compressor and turbine hubs 26 and 46 rotate to drive the fan blades 92. The fan operates over a speed range that can encompass the natural frequency of shaft 64 which transmits the torque produced by the turbine. Since the shaft 64 is rotating at a relatively high rate of speed, perhaps up to 100,000 revolutions per minute or more, there is therefore a very high centrifugal force which urges the spring 68 against the interior walls 66 of the shaft 64. This causes a substantial frictional engagement which acts to dampen both bending and torsional oscillations on the shaft. Since the spring is of flexible metal and since it is compact, it can easily be retained in the output shaft as an integral part. There is no need for maintenance or tuning since it is already an internal part of the shaft assembly.

While the preferred embodiment of the present invention has been described, it should be apparent that it may be provided in forms other than indicated without departing from its spirit and scope.

Having described the present invention, what is claimed as novel and desired to be secured by Letters Patent of the United States is:

1. A gas turbine engine comprising:
    a generally annular housing;
    a rotor assembly including a turbine journaled in said housing for rotation at a relatively high rate;
    an output element journaled in said housing at a point spaced from said rotor assembly;
    an elongated, relatively thin wall annular shaft extending from said rotor assembly to said output element, said shaft being connected at its ends to said rotor assembly and said output element so that said shaft transmits substantially all of the torque between said rotor assembly and said output element; and
    a cylindrical helical spring of resilient metal received in the interior walls of said relatively thin wall shaft, said cylindrical spring being acted upon by centrifugal force to expand radially outward into frictional engagement with the interior walls of said shaft thereby dampening oscillations of said shaft.

2. A gas turbine engine as in claim 1 wherein the diameter of the cylindrical spring in its relaxed state is larger than the diameter of the interior walls of said shaft whereby positive contact between the interior walls of the shaft and the spring is insured.

3. A gas turbine engine as in claim 1 wherein said shaft comprises an elongated central tube and end caps secured to the end of said tube, said spring being inserted before said end caps are secured.

4. A gas turbine engine as in claim 1 wherein said cylindrical spring is elongated and extends for a substantial portion over the interior walls of said shaft.

5. A gas turbine engine as in claim 1 wherein said output element is a bladed fan assembly driven by said output shaft.

6. A gas turbine engine as in claim 5 further comprising:
    a sun gear mounted on said shaft;
    at least one planet gear rotatable about a fixed axis and engaging said sun gear; and
    a ring gear engaging said planet gear and secured to said bladed fan assembly.

* * * * *